Figure 1:
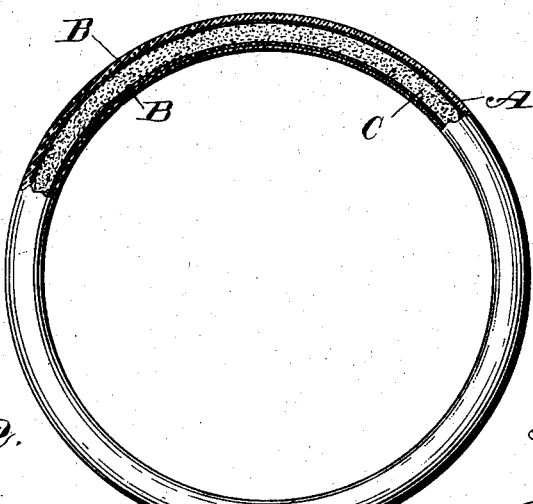

No. 706,590. Patented Aug. 12, 1902.
F. E. OSGOOD & F. F. BRADLEY.
VEHICLE TIRE.
(Application filed Feb. 17, 1902.)

(No Model.)

Witnesses:
H. S. Gaither
Geo. L. Wilkinson

Inventors
Fred E. Osgood.
and Franklin F. Bradley.
by
Attorney.

UNITED STATES PATENT OFFICE.

FRED E. OSGOOD AND FRANKLIN F. BRADLEY, OF CHICAGO, ILLINOIS, ASSIGNORS OF ONE-THIRD TO RICHARD A. KENT, OF CHICAGO, ILLINOIS.

VEHICLE-TIRE.

SPECIFICATION forming part of Letters Patent No. 706,590, dated August 12, 1902.

Application filed February 17, 1902. Serial No. 94,549. (No model.)

*To all whom it may concern:*

Be it known that we, FRED E. OSGOOD and FRANKLIN F. BRADLEY, citizens of the United States, residing at Chicago, county of Cook, State of Illinois, have invented a certain new and useful Improvement in Vehicle-Tires; and we declare the following to be a full, clear, and exact description of the invention, such as will enable others skilled in the art to which it pertains to make and use the same, reference being had to the accompanying drawings, which form a part of this specification.

Our invention relates in general to tires for wheels, and more particularly to rubber tires for bicycles, automobiles, or other vehicles.

In order that the tires of vehicles may possess sufficient resiliency to reduce the jar or shock resulting from uneven roads, it is common to manufacture tires of solid rubber or of rubber with an air-space between the rims of the wheels and the tires known as "cushion-tires," or of rubber tubes adapted to contain compressed air, known as "pneumatic" tires. The solid and cushion tires are objectionable, as they are necessarily quite heavy and also because of their limited resiliency. The objections to pneumatic tires are their liability to be punctured and their lack of durability.

The object of our invention is to produce a resilient tire which will be light in weight, thereby avoiding the objection to solid tires, which will continue in its normally-distended condition and not become permanently flattened by use, as will a cushion-tire, and which will not be injured by punctures, thereby obviating the disadvantage incident to pneumatic tires.

Our invention, briefly described, comprises a process for manufacturing resilient tires, consisting in forming a rubber tube of the size desired for the tire, inclosing within the tube a core of less bulk than the space within the tube and composed of a mixture of an expansible material and a gas-producing chemical, and subjecting the tire to sufficient heat to vulcanize the rubber tube and decompose the chemical, thereby expanding the core to fill the space within the tube.

Prior to our invention tires have been made in which a core of sponge-rubber has been surrounded by a rubber tube. It has also been proposed to manufacture such a tire by surrounding a core formed of sponge-rubber and ammonium carbonate by a rubber covering and then heating the tire, thereby decomposing the ammonium carbonate and vulcanizing the rubber covering. As the core before heating completely fills the space within the outer covering, the resulting tire is solid and does not possess the requisite resiliency.

Our invention will be more fully described hereinafter with reference to the accompanying drawings, in which the same is illustrated as embodied in two convenient and practical forms, and in which—

Figure 2:
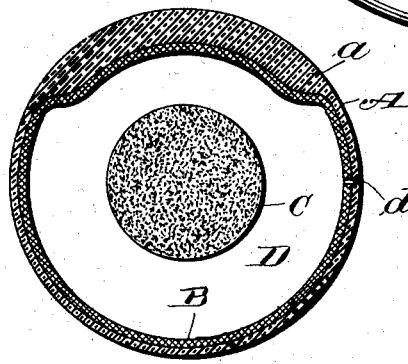
Figure 3:
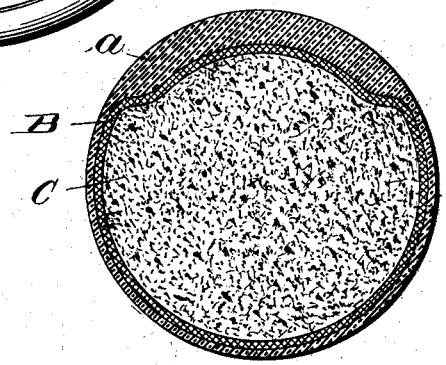

Figure 1 is an elevational view of a tire embodying our invention, part thereof being shown in section; Fig. 2, an enlarged cross-sectional view showing the tire before vulcanizing; Fig. 3, a view similar to Fig. 2, showing the tire after vulcanizing; and Figs. 4 and 5, views similar to Figs. 2 and 3, showing a modified embodiment of our invention.

Similar reference characters are used to designate similar parts in the several views of the drawings.

Referring particularly to Figs. 1, 2, and 3, reference-letter A indicates the outer covering of the tire, which is composed of some durable material, preferably rubber, the thickness of which along the portion thereof which serves as a tread of the tire is thicker, as shown at *a*, so as to prolong the life of the tire by reinforcing the portion thereof where the greatest wear occurs. In close contact with the inner surface of the outer covering A is a protecting and strengthening layer B, formed of any suitable material—such, for instance, as canvas—which serves as a casing for the inner part of the tire and to prevent the penetration of sharp objects through the same into the interior of the tire. The space within the protecting-layer B is filled by a resilient and porous material—such, for instance, as sponge-rubber—the interstices of which are filled with gas under tension, thereby imparting to the tire the desired resiliency, at the same time maintaining the same normally distended. As the porous material comprises innumerable separate cells or interstices containing the gas under pressure, the penetration of the tire at any one point liberates the gas from the pores which are penetrated only and does not permit the escape of the gas from the interior of the rest of the tire. Consequently a puncture does not injuriously affect the whole tire, but only the small portion thereof directly punctured. Should the tire be cut so as to cause the outer covering to open to an extent which would endanger the durability of the tire, such cut may be closed by cement or in any suitable manner. The preferred method of constructing the tire, as illustrated in Figs. 1 and 3, is to locate within the protecting layer B a mass of material C insufficient to completely fill the space within the tire, after which the protecting-covering B and the outer covering A are closed in a manner common in the art of making pneumatic tires. The core C consists in a material capable of being expanded and then retained permanently in such expanded condition—as, for instance, uncured sponge-rubber stock. The uncured sponge-rubber stock or other equivalent material prior to being closed within the tire is mixed with a chemical capable of being decomposed, so as to form a gas when subjected to heat. While we do not wish to limit ourselves to any particular chemical, we have found in practice that a metallic salt—such, for instance, as ammonium carbonate—is capable of giving good results. After the core C has been inclosed within the outer covering the tire is subjected to the degree of heat necessary for vulcanization of the rubber, which decomposes the chemical, thereby liberating a gas which expands throughout the interstices of the core and is confined in the innumerable separate cells throughout the expanded core. During the process of vulcanization the outer covering surrounding the core does not expand. Consequently the initial exterior diameter of the tire remains the same when it is finished. Prior to inserting the core C within the outer covering of the tire it is preferably so formed as to have a circular cross-section the diameter of which is enough smaller than the interior diameter of the completed tire to permit the core to expand when the gas is liberated from the chemical during the vulcanizing process sufficiently to completely fill the interior space of the tire and impart to the same the desired tension. One or more perforations $d$ are preferably formed through the outer covering A and protecting-covering B, through which the air is expelled when the core C expands and fills the space D between the same and the protecting material B.

Figure 4:
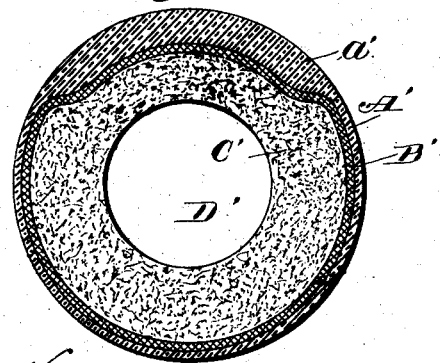
Figure 5:
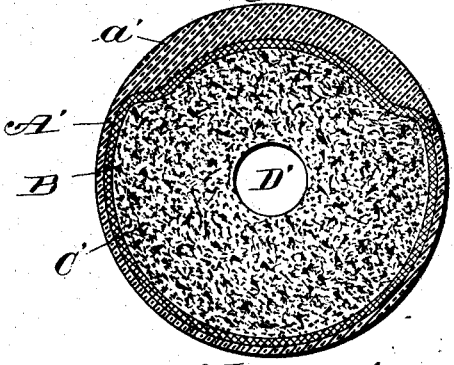

In Figs. 4 and 5 we have illustrated a modified embodiment of our invention, in which, as in the form shown in Figs. 1, 2, and 3, an outer covering A', having a reinforced tread $a'$, is provided, within which is located a protecting layer B'. The core is, however, formed tubular, with an air-space D' in the center thereof. In this embodiment of our invention the core C' is formed of an exterior diameter corresponding to the interior diameter of the protecting material B', which, together with the outer covering A', is wrapped around the core C' and secured in any well-known manner. Prior to locating the core C' within the outer covering it is run through a tubing-machine having a mandrel of sufficient size to form the interior air-space D'. The material of which the core C' is formed may be the same as that of the core C in the embodiment of our invention shown in Figs. 1, 2, and 3— namely, a mixture of ordinary rubber stock so made as to be capable of vulcanization and a chemical—such as ammonium carbonate, for instance—which is capable of being decomposed, and thereby forming a gas upon the application thereto of the same degree of heat required for vulcanizing the rubber. The tire is shown in Fig. 4 as it appears prior to vulcanizing, while in Fig. 5 the tire is illustrated in its complete form, the same having been subjected to the necessary heat to vulcanize the rubber, which has also decomposed the chemical, and thereby liberated the gas, which has permeated throughout the pores of the core and imparted the requisite tension to the tire.

While the finished tire may, as illustrated in Fig. 5, have a small opening in the center thereof, it is preferable that the bulk and proportion of ingredients in the mixture should be such as to completely fill the space within the outer covering, as shown in Fig. 3, when subjected to the requisite heat.

The tension of the completed tire may be regulated by the amount of the chemical mixed with the rubber stock, as the volume of liberated gas is of course dependent upon the amount of the chemical used. The weight and resiliency of the tire may be regulated by the amount of stock used in the core, so that when it expands the proportion of increase in its bulk will be greater or less, as desired.

From the foregoing description it will be observed that we have invented an improved process for manufacturing a vehicle-tire which possesses the resiliency of a pneumatic tire without the liability to be injured by punctures, and although of a weight only slightly greater than a pneumatic tire possesses the durability of a solid tire.

While we have described more or less precisely the details of construction, we do not wish to be understood as limiting ourselves thereto, as we contemplate changes in form, the proportion of parts, and the substitution of equivalents as circumstances may suggest or render expedient without departing from the spirit of our invention.

Having now fully described our invention, what we claim as new, and desire to secure by Letters Patent, is—

1. The process of manufacturing vehicle-tires which consists in inclosing within an outer covering a core of less bulk than the space within the covering and composed of a mixture of an expansible material and a chemical capable of generating gas when heated, and heating said mixture to generate a gas and permanently expand the core to completely fill the space within the outer covering without expanding said covering the initial exterior diameter of which remains the same in the finished tire.

2. The process of manufacturing vehicle-tires which consists in inclosing within an outer covering a core of less bulk than the space within the covering composed of a mixture of rubber stock and ammonium carbonate, and subjecting the tire to heat whereby the ammonium carbonate is decomposed and the core expanded to fill the space within the outer covering without expanding said covering the initial exterior diameter of which remains the same in the finished tire.

3. The process of manufacturing vehicle-tires which consists in forming a tube of the size desired for the tire, inclosing within the tube a core of less bulk than the space within the tube composed of a mixture of expansible material and a gas-producing chemical, decomposing the chemical and thereby generating gas and expanding the core to fill the space within the tube without expanding said tube the initial exterior diameter of which remains the same in the finished tire, and expelling the air from the space within the tube as the core expands.

4. The process of manufacturing vehicle-tires which consists in forming a rubber tube of a diameter equal to the size of the tire, inclosing in the tube a core of less bulk than the space within the tube composed of a mixture of rubber stock and ammonium carbonate, subjecting the tire to sufficient heat to vulcanize the rubber tube and decompose the ammonium carbonate thereby generating a gas and expanding the core to fill the space within the tube without expanding said tube the initial exterior diameter of which remains the same in the finished tire, and expelling the air from the space within the tube as the core expands.

In testimony whereof we sign this specification in the presence of two witnesses.

FRED E. OSGOOD.
FRANKLIN F. BRADLEY.

Witnesses:
GEO. L. WILKINSON,
CLARA C. CUNNINGHAM.